United States Patent [19]
Felden

[11] 3,842,886
[45] *Oct. 22, 1974

[54] TIRE REPAIR BODY
[75] Inventor: Alois Felden, Munchen, Germany
[73] Assignee: Stahlgruber, Otto Gruber & Company, Munchen, Germany
[*] Notice: The portion of the term of this patent subsequent to Mar. 14, 1989, has been disclaimed.
[22] Filed: Sept. 24, 1971
[21] Appl. No.: 183,577

[30] Foreign Application Priority Data
Sept. 29, 1970  Germany............................ 2047735

[52] U.S. Cl. .............................................. 152/370
[51] Int. Cl. ......................................... B60c 21/02
[58] Field of Search......................... 152/367, 370

[56] References Cited
UNITED STATES PATENTS
3,095,342  6/1963  Kraly .................................. 152/370
3,282,320  11/1966  Klouza ............................... 152/370
3,648,750  3/1972  Felden ................................ 152/370

FOREIGN PATENTS OR APPLICATIONS
160,359  3/1921  Great Britain ..................... 152/370

*Primary Examiner*—M. Henson Wood, Jr.
*Assistant Examiner*—Robert Saifer
*Attorney, Agent, or Firm*—Connelly and Hutz

[57] ABSTRACT

A tire repair body for repairing tears or holes in vehicle tires comprises a patch for covering the damaged area from the tire interior and a stem which fills the hole and has a loop at its free end for accommodating an inserting tool. The stem is made of a combination of supporting elements comprising elastic vulcanized rubber and a pliable mass surrounding at least most of the vulcanized rubber with the pliable mass being made of a material which is unvulcanized and remains pliable. The supporting elements are bent in a U-shape and connected to the patch at both ends to form the loop.

9 Claims, 1 Drawing Figure

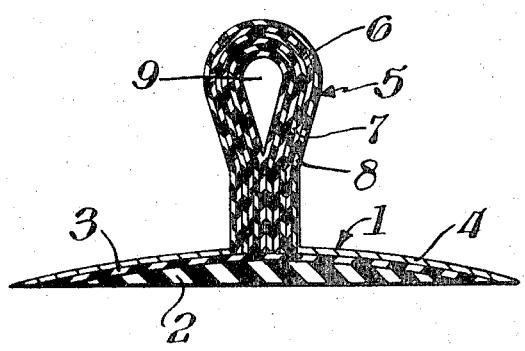

TIRE REPAIR BODY

BACKGROUND OF THE INVENTION

The invention deals with a repair material for the repair of holes for tear shaped damaged spots in automobile tires. Such repair bodies are in the form of plugs consisting of a patch covering the damaged spot on the inner side of the tire and a shaft portion or stem filling the damaged spot. The outer end of the stem has a loop for suspension of a pull-in device or accommodating a suitable inserting tool.

Such repair materials that are already known did not prove satisfactory in practice, because in order to ensure reliable repairs, it is necessary that the damaged spot be very exactly and cleanly prepared; in other words the injury must be shaped to a cross section corresponding to the plug stem. Hair line tears are frequently overlooked, so that when the stem or shaft portion, whose diameter has to exceed that of the hole channel of the damaged spot to ensure a firm positioning, is drawn in, the hair line tears are widened and moisture and dirt penetrate through them so that there may be a progressive destruction of the entire tire structure.

For this reason repair substances are known particularly for the repair of tubeless tires in which an elongated material is used without a patch covering the damaged spot on the inside, consisting of a combination of supporting elements made of elastic vulcanized rubber with a pliable mass partly or wholly surrounding them, that remains unvulcanized and pliable save for the outer layer serving as vulcanizing connection with the object to be repaired.

For application, these repair materials are folded in the middle and introduced by means of a suitable device, such as thin wedges or a type of fork, into the tear or hole channel of the damaged automobile or vehicle tire. Thus the connecting layer consisting of unvulcanized, vulcanizable rubber lies on the outside, while the unvulcanized, pliable layers which remain vulcanized stay on the inside.

The layered structure of the repair material and the prescribed folding allow adjustment of the repair material to the inside contours of the damaged spot, so that no unfilled gaps or hair line tears remain even in unpretreated hole canals. Such unprepared holes are canals not adjusted to the cross section of the repair material, since owing to their plasticity parts of the unvulcanized intermediate layers are squeezed out and pressed into the gaps or tears.

The repair method described above has proved basically satisfactory, although it was found that sometimes, notably when the repair material was not folded precisely in the middle and was caught up in the wedge or fork, only the longer portion of the folded material remained in the hole canal of the tire, while the shorter portion slipped inside the tire and there carried out rotating movements causing enlargement of the inside hole outlet.

The compressed air enclosed in the tire can find its way to the damaged spot and separate the tissue layers of the tire body, because, due to the sealing of the damaged spot which is still effective, it cannot escape to the outside.

Furthermore in such cases it was found that only half the mass repair material was available for filling the hole canal, which was not sufficient to plug up the damaged spot really lastingly. In order to avoid such faults it was therefore necessary that the repair material suspended in the pull-in device or inserting tool always be so adjusted before being introduced into the damaged spot that it should be fastened exactly in the middle. This condition, however, was understandably not always sufficiently adhered to, particularly by unskilled and inexperienced mechanics.

SUMMARY OF THE INVENTION

This invention therefore is based on the task of overcoming the above drawback and to ensure an absolutely secure repair, even of damaged spots not given special preparation. Thus the invention consists of a repair material for repairing tear or hole shaped injuries in automobile or vehicle tires, consisting of a patch covering the damaged spot on the inside of the tire and a shaft portion or stem filling the damaged spot; the outer end of the shaft being furnished with a loop for suspension of a pull-in mechanism or inserting tool. The invention is characterized by the fact that the shaft portion consists of a combination of supporting elements, in a manner which is known in itself, made of elastic vulcanized rubber with a pliable, unvulcanized mass that remains pliable wholly or mostly surrounding it. The material is bent into a U-shape and connected to the patch at both ends thereby forming the loop.

THE DRAWING

The single FIGURE shows a cross section through a tire repair body exemplifying this invention.

DETAILED DESCRIPTION

The repair material or tire repair body, represented in the drawing consists of a patch 1 the structure of which is known in itself, namely a patch material 2 made of vulcanized rubber in which, if desired, reinforcement elements, for instance fabric layers, can be incorporated, and a connecting layer 3 of unvulcanized vulcanizable rubber. This connecting layer, if desired, can as usual be covered by a protective layer 4.

The shaft portion or stem 5 consists of a combination of supporting elements. In the example illustrated shaft 5 is in the form of individual layers 6, 7, of which some consist of elastic vulcanized rubber, while others consist of a pliable mass which remains unvulcanized with the exception of the outermost layer which serves as connecting layer 8. The shaft 5, the diameter of which may be chosen as desired, is bent in a U-shape for reasons of manufacturing technique and because the holes are seldom circular, but usually elongated. Thus it is best for the shaft to be rectangular, as can be seen from the drawing, bent in a U-shape and connected at both ends to the patch, forming a loop 9.

As can be seen the two legs of the U-shaped shaft can lie up against one another at their end portion and be connected, the length of this portion roughly corresponding to the thickness of the tire to be repaired, or preferably somewhat longer.

By constructing the shaft portion according to the invention it is possible to suspend a hook-shaped inserting device into the loop 9, which had been previously introduced into the tire from the outside through the hole channel and of pulling the repair body securely into the damaged place. For this one can roughen the surface covered by the patch in the manner known and both this surface and the hole canal can be pretreated with a solution or paste producing cold vulcanization. The possibility of filling the hole canal with only one half of the repair material supplied is definitely avoided by the repair material in accordance with the invention, because by means of the patch connection to the shaft, forming one unit, additional security is provided against air escape.

What is claimed is:

1. A tire repair body for repairing tear or hole-shaped injuries in vehicle-tires consisting of a patch adapted to cover the injured area on the interior of the tire and a shaft of composite material, said shaft comprising elongated supporting elements of a vulcanized elastic rubber and layers of an unvulcanized pliable mass surrounding at least most of the surface of said supporting elements, said vulcanized pliable mass being adapted to remain uncured and pliable; said shaft in its normal condition being bent in a U-shape with its ends connected to said patch so as to form a loop remote from the patch to accommodate an inserting tool, the legs of the U-shape shaft being in engagement with each other and otherwise unconnected to each other except for their connection to the patch and to the loop, said shaft thereby comprising a plug portion connected to said patch and a loop portion remote from said patch, and said plug portion and said loop portion being of one-piece integral construction with no distinct dividing line therebetween.

2. A tire repair body as set forth in claim 1 wherein said pliable mass completely surrounds said vulcanized rubber.

3. A tire repair body as set forth in claim 1 wherein said shaft includes an outermost vulcanizable layer for connection to the tire.

4. A tire repair body as set forth in claim 1 wherein said U-shaped shaft is rectangular in cross section.

5. A tire repair body as set forth in claim 1 wherein the two legs of said U-shaped shaft are connected to each other adjacent said patch over an area generally corresponding to the tire thickness.

6. A tire repair body as set forth in claim 5 wherein said U-shaped shaft is rectangular in cross section.

7. In combination therewith, a vehicle tire having an injury extending through said tire; a tire repair body, said tire repair body including a patch-like part thereof covering said injury on the interior of said tire; a U-shaped shaft comprising elongated supporting elements of an elastic vulcanized rubber and an unvulcanized and pliable mass surrounding at least most of the surfaces of that supporting elements, said shaft filling said injury; said mass remaining unvulcanized and pliable indefinitely, the ends of that shaft in its normal condition prior to insertion in the tire being bent in a U-shape with its ends being connected to said patch and having a loop formed remote from said patch and extending outwardly beyond the tire tread, the legs of the U-shape shaft being in engagement with each other and otherwise unconnected to each other except for their connection to the patch and to the loop, said shaft thereby including a plug portion filling said injury and connected at one end to said patch and at its other end to said loop, and said plug portion and said loop being of one-piece integral construction with no distinct dividing line therebetween.

8. The combination of claim 1 wherein said shaft includes an outermost vulcanizable layer for connection to the walls of said injury.

9. The combination of claim 1 wherein said shaft includes an outermost vulcanizable layer, said patch-like part comprising a vulcanized layer, a vulcanizable layer connected to said vulcanized layer of said patch-like part, and said outermost vulcanizable layer of said shaft being disposed in contact with said vulcanizable layer of said patch-like part for connection of said vulcanizable layers to each other and to said tire.

* * * * *